(12) United States Patent
Schäfer et al.

(10) Patent No.: US 10,237,731 B2
(45) Date of Patent: Mar. 19, 2019

(54) COMMUNICATION SYSTEM WITH PKI KEY PAIR FOR MOBILE TERMINAL

(71) Applicant: GIESECKE & DEVRIENT GMBH, München (DE)

(72) Inventors: Frank Schäfer, Puchheim (DE); Ullrich Martini, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/501,302

(22) PCT Filed: Jul. 28, 2015

(86) PCT No.: PCT/EP2015/001556
§ 371 (c)(1),
(2) Date: Feb. 2, 2017

(87) PCT Pub. No.: WO2016/020046
PCT Pub. Date: Feb. 11, 2016

(65) Prior Publication Data
US 2017/0223529 A1 Aug. 3, 2017

(30) Foreign Application Priority Data
Aug. 4, 2014 (DE) .................. 10 2014 011 687

(51) Int. Cl.
*H04L 9/08* (2006.01)
*H04L 29/06* (2006.01)
(Continued)

(52) U.S. Cl.
CPC ........... *H04W 12/04* (2013.01); *H04L 9/0822* (2013.01); *H04L 63/045* (2013.01);
(Continued)

(58) Field of Classification Search
None
See application file for complete search history.

(56) References Cited

U.S. PATENT DOCUMENTS 6,105,012 A * 8/2000 Chang .................. G06Q 20/00 380/277
7,346,171 B2 * 3/2008 Numao .................. H04L 9/085 380/286
(Continued)

FOREIGN PATENT DOCUMENTS

WO 02102009 A2 12/2002
WO 03091858 A2 11/2003

OTHER PUBLICATIONS

German Office Action for corresponding German Application No. 102014011687.5, dated Mar. 16, 2015.
(Continued)

*Primary Examiner* — Christopher A Revak
(74) *Attorney, Agent, or Firm* — Workman Nydegger

(57) ABSTRACT

A PKI key pair comprising a private key and a public key is arranged for the end device. The public key is stored at the communication partner. The communication partner is arranged to provide a session key, encrypt data using the session key, encrypt the session key using the public key and convey the encrypted data to the end device. The communication system is further characterized in that it comprises a server system, remote from the mobile end device, in which the private key is stored in a secure environment. For this, the communication partner is furthermore arranged to transmit the encrypted session key to the server system. Moreover, the server system is arranged to decrypt the session key for the end device with the private key and to transmit it in decrypted form to the end device for decrypting the data.

11 Claims, 1 Drawing Sheet

(51) Int. Cl.
*H04W 12/02* (2009.01)
*H04W 12/04* (2009.01)

(52) U.S. Cl.
CPC .......... *H04L 63/0435* (2013.01); *H04L 63/06* (2013.01); *H04L 63/062* (2013.01); *H04W 12/02* (2013.01); *H04L 63/068* (2013.01); *H04L 2209/80* (2013.01)

(56) References Cited

U.S. PATENT DOCUMENTS

| | | | | |
|---|---|---|---|---|
| 7,409,061 B2* | 8/2008 | Newcombe | ............ | A63F 13/12 |
| | | | | 380/251 |
| 7,716,483 B2* | 5/2010 | Sozzani | ............... | H04L 9/0822 |
| | | | | 380/277 |
| 8,085,937 B1 | 12/2011 | Bradley, II | | |
| 8,433,069 B2* | 4/2013 | Noda | .................... | H04L 9/3236 |
| | | | | 380/259 |
| 8,954,740 B1* | 2/2015 | Moscaritolo | .......... | H04L 63/065 |
| | | | | 380/277 |
| 2004/0034776 A1* | 2/2004 | Fernando | .............. | H04L 9/0825 |
| | | | | 713/171 |
| 2004/0078593 A1* | 4/2004 | Hind | ................... | H04L 63/0281 |
| | | | | 726/26 |
| 2006/0277092 A1* | 12/2006 | Williams | .......... | G06F 17/30206 |
| | | | | 705/65 |
| 2007/0130070 A1* | 6/2007 | Williams | ............... | G06Q 30/02 |
| | | | | 705/50 |
| 2009/0158394 A1* | 6/2009 | Oh | ......................... | G06F 21/31 |
| | | | | 726/3 |
| 2012/0155646 A1* | 6/2012 | Seshadri | ................ | H04L 9/083 |
| | | | | 380/279 |
| 2016/0234025 A1* | 8/2016 | Tomkow | ................ | H04L 51/30 |

OTHER PUBLICATIONS

International Search Report for corresponding International PCT Application No. PCT/EP2015/001556, dated Oct. 21, 2015.

* cited by examiner

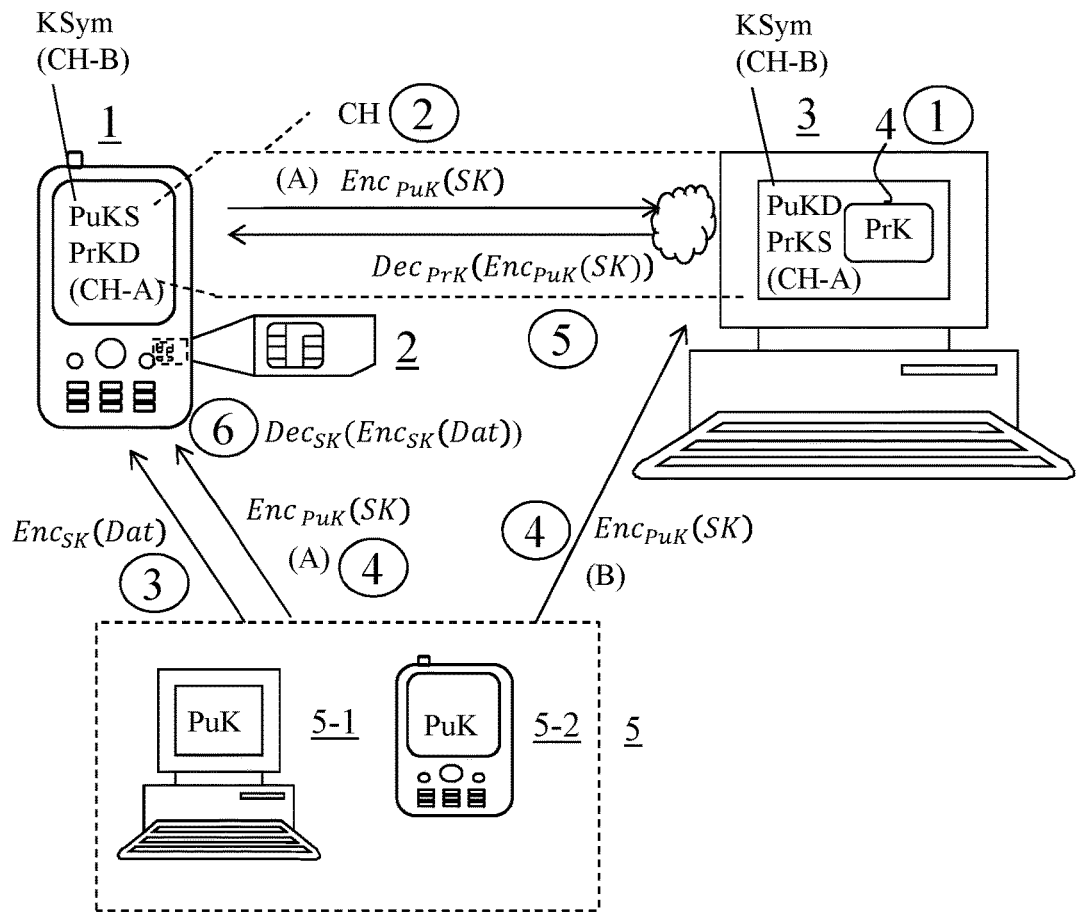

COMMUNICATION SYSTEM WITH PKI KEY PAIR FOR MOBILE TERMINAL

BACKGROUND

The invention relates to a communication system, comprising a mobile end device and a communication partner, wherein a PKI key pair, comprising a private key and a public key, is arranged for the end device according to the preamble of claim 1.

To utilize a mobile end device such as a smartphone or mobile phone in a mobile radio network of a network provider, the end device has a subscriber identity module with a subscription. The subscriber identity module can be designed either as a removable plug-in SIM card (SIM=Subscriber Identity modules) or USIM card (Universal SIM) or UICC (Universal Integrated Circuit Card), or alternatively as solid-soldered eUICC (embedded UICC) or eSIM or eUSIM. The subscription is formed by a data set which enables the establishing, operating and terminating of a connection of the end device in the mobile radio network. As a connection, a voice connection, for example, can be provided to make telephone calls, or a data connection to transmit files, e-mails, streamed speech data and other data.

Increasingly, there exists the wish to implement into the subscriber identity module, in addition to the actual basic service voice connection (telephone services) and optionally data connection, additional cryptographic services such as services for encrypting voice connections or data connections, wherein language or data are transmitted encrypted with a session key. For example, the mobile network operator Vodafone offers an application for encrypted voice connections ("Chancellor-Phone for everybody") under the designation "Secure Call" as well as further similar services. To enable the services, a PKI infrastructure is arranged in the end device, and thereby preferably in the subscriber identity module. For this purpose, a long-lived private PKI key is stored in the subscriber identity module. The public PKI key corresponding to the private PKI key is outputted to the communication partner. The PKI infrastructure enables the communication partners to exchange the session key. The subscriber identity module forms a secure environment in which private PKI keys are stored secure from unauthorized access. Some end devices do not grant access to the subscriber identity module to store additional keys in the subscriber identity beyond the subscription. In this case the private PKI keys are stored directly in the end device where they are comparatively unprotected.

The document U.S. Pat. No. 8,085,937 B1 from the prior art discloses in FIG. 5 and the accompanying description a communication system with a remote key-generation server. The system comprises a mobile end device 40B and a communication partner 60B, wherein a PKI key pair, comprising a private key and a public key, is arranged for the end device. The public key is stored at a server system remote from the end device. The remote server is arranged to supply a session key, to encrypt the session key with the public key, and to transmit to the encrypted session key to the end device. The end device is arranged for decrypting the session key obtained from the server with the private session key. The communication partner obtains the session key as well, encrypts data ("Voice") with it and sends it to the end device which can again decrypt it with the session key.

SUMMARY

The invention is based on the object of creating a secure, efficient communication system which is realizable even if a highly secure storage of keys is not possible in the end device, e.g. in the subscriber identity module.

The inventive communication system according to claim 1 comprises a mobile end device and a communication partner (another electronic communication device). A PKI key pair comprising a private key and a public key is arranged for the end device. The public key is stored at the communication partner. The communication partner is arranged to provide a session key, encrypt data using the session key, encrypt the session key using the public key and convey the encrypted data to the end device.

The communication system is further characterized in that it comprises a server system, remote from the mobile end device, in which the private key is stored in a secure environment. For this, the communication partner is furthermore arranged to transmit the encrypted session key to the server system. Moreover, the server system is arranged to decrypt the session key for the end device with the private key and to transmit it in decrypted form to the end device for decrypting the data.

The secure environment in the server system therefore forms a secure, external memory area for the long-lived private key which offers a safety comparable to a subscriber identity module operated in the end device, such as a SIM card. In the end device, only the session key is provided which can be exchanged for a new session key if needed, e.g. if the session key has been spied out or stolen. The session key can easily be exchanged because it can be defined, for example, by the communication partner. It would be more elaborate to exchange the private key in the end device because the corresponding new public key would have to be communicated to all possible communication partners.

Therefore, according to claim 1, a secure, efficient communication system has been created which is realizable even if a highly secure storing of keys is not possible in the end device, e.g. in the subscriber identity module.

In comparison to a private key stored locally in the subscriber identity module of the end device, the private key stored in the server system even has the additional advantage that the private key can also be exchanged with reasonable effort, thus can be replaced by a new key.

The session key is electively set by the communication partner. Alternatively, the communication partner accepts the session key from a key generator, e.g. from the server system. Electively a random number is provided as a session key, e.g. a random number generated by the communication partner.

According to a first alternative, the communication partner is arranged to transmit the session key encrypted with the public key directly to the server system. The server system accepts the encrypted session key from the communication partner, decrypts it with the private key of the end device—which is stored in the server system—and sends the decrypted session key to the end device. Finally, the end device decrypts the data received from the communication partner in encrypted form with the session key received by the server system.

According to a second alternative, the communication partner is arranged to transmit the encrypted session key to the server system via the end device. Besides, the end device is further arranged to accept the encrypted session key from the communication partner and to transmit it to the server system. The further proceedings are the same as for the first alternative. The server system thus decrypts the session key with the private key and sends it to the end device which decrypts the data with the session key. With the second alternative, only the end device requires a connection to the server system, the communication partner, however, does not.

Preferably, a secure communication channel is arranged between the end device and the server system. For this, the server system is arranged to transmit the session key to the end device via the secure communication channel. In this way it is guaranteed that the decrypted session key, now in plain text, is not spied out.

For the secure communication channel, electively at least one asymmetric key pair is stored in the server system and in the end device in a distributed manner. At least one asymmetric key pair is stored in the server system, which enables the encrypted transmission (newly encrypted with another key) of the decrypted session key from the server system to the end device. The asymmetric key pair of the secure communication channel is preferably employed exclusively for operating the secure channel between the end device and the server system, and in particular is never outputted to communication partner. In this way the asymmetric key pair of the secure communication channel can be exchanged (i.e. renewed) relatively simply in case it is no longer secure, e.g. because it was spied out. For example, a public key for the communication channel is stored in the server system and the corresponding private key in the end device. Electively, a further asymmetric key pair is provided for the secure communication channel, for transmitting data in the reverse direction, i.e. from the end device to the server system.

Electively, the session key has a validity which comprises only one individual key-employment operation, and the validity of the session key ends as soon as the session key has been used for the key-employment operation. An encryption is electively provided as a key-employment operation. The session key is therefore short-lived. If the short-lived session key is spied out, the damage is small. If the long-lived private key of the end device was spied out, the damage would be considerable.

Electively, the communication system is arranged to accept a plurality of decrypted session keys from the server system on the end device and store them for later use, without requiring between the employments of the plurality of the session keys a connection between the server system and the end device. In this variant, the end device keeps several session keys in storage. The variant is advantageous in particular for session keys which are employable only for a single decryption operation. For this the end device can sequentially carry out several communication sessions with communication partners, for which the end device accepts encrypted data from a communication partner and decrypts it in the end device. Between two communication sessions, the end device does not have to establish a connection to the server system until the session keys stored on stock are used up.

Electively, the session key has a time-limited validity period so that the session key will become invalid upon expiry of the validity period without any further effort. In this way it can, for example, be attained that session keys saved in storage which have not been employed become invalid after a permissible maximum validity period, even if they have not been employed.

Electively a symmetric key is provided as a session key. Symmetric encryption and decryption algorithms are substantially faster than asymmetric ones. Hence symmetric algorithms are advantageous for encrypting larger amounts of data.

Alternatively, an asymmetric key can be provided as a session key, in particular a private session key derived from the private key, preferably a short-lived derived key.

One or several the following is provided electively as data: speech data, files, general data, e-mails. For speech data, a communication session between the end device and the communication partner thus comprises an encrypted telephone call or encrypted VoIP (Voice over Internet Protocol). For files, general data or e-mails, a communication session between the end device and the communication partner comprises an encrypted transmission of files or general data, in particular also of e-mails.

Electively, an application is provided respectively in the end device and at the communication partner to operate communication sessions in which encrypted data is transmitted by the communication partner to the end device and is decrypted there.

Electively, the communication system comprises several communication partners who all have the same public key of the end device.

With other key pairs, the end device can simultaneously be communication partner and vice versa.

BRIEF DESCRIPTION OF THE DRAWINGS

Hereinafter the invention will be explained more closely on the basis of exemplary embodiments and with reference to the drawing, in which are shown:

FIG. 1 a communication system according to one embodiment of the invention comprising two alternatives A and B.

DETAILED DESCRIPTION OF VARIOUS EMBODIMENTS

FIG. 1 shows a communication system, according to one embodiment of the invention, comprising two alternatives A and B. The communication system comprises a mobile end device 1 (smartphone), with a SIM card 2 (=subscriber identity module) operated in the end device 1, a server system 3 with a secure environment 4, as well as a communication partner 5. The communication partner 5 is an electronic communication device, e.g. a PC 5-1 or a (further) mobile end device 5-2.

Hereinafter, a communication session between the end device 1 and the communication partner 5 is described.

In a step 1, the server system 3 generates in the secure environment 4 an asymmetric key pair comprising a private key PrK and a public key PuK. The private key PrK remains secure in the secure environment 4 of the server system 3. The public key PuK is stored, on the one hand, in the server system 3 and, on the other hand, is distributed to all potential, interested communication partners 5 of the end device 1. Optionally the public key PuK can also be stored in the end device 1, but does not have to be.

In a step 2, a secure communication channel CH is arranged between the server system 3 and the end device 1 which at least enables that the server system 3 can securely send messages to the end device 1. For example, for this purpose a public channel CH key PuKD of the end device 1 is stored in the server system 3 (D=device=end device), and the corresponding private channel CH key PrKD is stored in the end device 1. The server system 3 encrypts data to be transmitted securely (e.g. the session key) with the public channel CH key PuKD, sends it to the end device 1, and the end device 1 decrypts the data with the private channel CH key PrKD. Optionally, the secure channel CH comprises a further key pair PrKS, PuKS (S=server) for transmitting data from the end device 1 to the server system 3. The keys PrKD, PuKD and, where applicable, PrKS, PuKS of the secure channel CH are preferably employed exclusively for operating the secure channel CH between the end device 1 and the server system 3, and in particular are never outputted to communication partner 5.

In a step 3, the communication partner 5 encrypts data DAT with a session key SK and sends the encrypted data Enc(SK)(DAT) to the end device 1. The session key SK is generated either by the communication partner 5 itself, or is accepted from another source, in particular from the server system 3 for example. In the embodiment example from FIG. 1, the communication partner 5 itself generates a symmetric session key SK for the data encryption.

In a step 4, the communication partner 5 encrypts the session key SK with the public key of the end device 1 to a key cipher Enc(PuK)(SK).

According to an alternative A, in step 4 the communication partner 5 sends the encrypted session key Enc(PuK)(SK) to the end device 1, preferably together with the encrypted data Enc(SK)(DAT) according to step 3. The end device 1 retransmits the encrypted session key Enc(PuK)(SK) to the server system 3 which receives said session key.

According to an alternative B, in step 4 the communication partner 5 sends the encrypted session key Enc(PuK)(SK) directly to the server system 3, which receives said session key.

In a step 5, the server system 3 decrypts the received encrypted session key Enc(PuK)(SK) with the private key PrK of the end device 1. As a result of this, the session key SK is restored to plain text. The server system 3 transmits the decrypted session key SK via the secure channel CH to the end device 1.

Now the session key SK on the end device 1 is available in plain text. In a step 6, the end device 1 decrypts with the session key SK the encrypted data Enc(SK)(DAT) received from the communication partner 5 into data DAT in plain text, in detail: Dec(SK) (Enc(SK)(DAT)).

The invention claimed is:

1. A communication system, comprising a mobile end device and a communication partner,
wherein a PKI key pair comprising a private key and a public key is arranged for the end device,
wherein the public key is stored at the communication partner, the communication partner comprising a physical device separate from the mobile end device, and the communication partner is arranged to supply a session key,
to encrypt data with the session key,
to encrypt the session key with the public key and
to transmit the encrypted data (DAT) to the end device, wherein
the communication system further comprises a server system, remote from the mobile end device, in which the private key is stored in a secure environment,
the communication partner is further arranged to transmit the encrypted session key to the server system, and
the server system is arranged to decrypt the session key for the end device with the private key and transmit the session key in decrypted form to the end device for decrypting the data.

2. The communication system according to claim 1, wherein the communication partner is arranged to transmit the encrypted session key directly to the server system.

3. The communication system according to claim 1, wherein the communication partner is arranged to transmit the encrypted session key via the end device to the server system, wherein the end device is further arranged to accept the encrypted session key from the communication partner and transmit it to the server system.

4. The communication system according to claim 1, wherein a secure communication channel is arranged between the end device and the server system and wherein the server system is arranged to transmit the decrypted session key via the secure communication channel to the end device.

5. The communication system according to claim 4, wherein for the secure communication channel at least an asymmetric key pair is stored in the server system and in the end device in a distributed manner.

6. The communication system according to claim 1, wherein the session key has a validity which comprises only one single key-employment operation, and the validity of the session key ends as soon as the session key has been employed for the key-employment operation.

7. The communication system according to claim 1, wherein the end device is arranged to accept a plurality of decrypted session keys from the server system on the end device and store them for later employment, without requiring a connection between the server system and the end device between the employments of the plurality of session keys.

8. The communication system according to claim 1, wherein the session key has a time-limited validity period so that the session key will become invalid upon expiry of the validity period.

9. The communication system according to claim 1, wherein a symmetric key is provided as a session key.

10. The communication system according to claim 1, wherein there is provided as a session key an asymmetric key, in particular a private session key derived from the private key.

11. The communication system according to claim 1, wherein there are provided as data one or more of the following: speech data, files, general data, e-mails.

* * * * *